United States Patent
Viinikanoja et al.

(10) Patent No.: US 7,961,234 B2
(45) Date of Patent: Jun. 14, 2011

(54) ELECTRONIC EQUIPMENT AND METHOD IN ELECTRONIC EQUIPMENT FOR FORMING IMAGE INFORMATION AND A PROGRAM PRODUCT OR IMPLEMENTATION OF THE METHOD

(75) Inventors: Jarkko Viinikanoja, Tampere (FI); Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 658 days.

(21) Appl. No.: 10/586,402

(22) PCT Filed: Feb. 24, 2005

(86) PCT No.: PCT/FI2005/050048
§ 371 (c)(1),
(2), (4) Date: Jul. 18, 2006

(87) PCT Pub. No.: WO2005/081545
PCT Pub. Date: Sep. 1, 2005

(65) Prior Publication Data
US 2008/0225129 A1    Sep. 18, 2008

(30) Foreign Application Priority Data
Feb. 25, 2004   (FI) .................................. 20045055

(51) Int. Cl.
*H04N 5/247* (2006.01)
*H04N 15/00* (2006.01)
*H04N 5/225* (2006.01)
*G06K 9/00* (2006.01)
*G03B 35/00* (2006.01)

(52) U.S. Cl. ....... 348/264; 348/47; 348/218.1; 348/374; 382/154; 396/325

(58) Field of Classification Search ............... 348/264, 348/239, 41, 47, 159; 396/325
See application file for complete search history.

(56) References Cited

U.S. PATENT DOCUMENTS

| | | | | |
|---|---|---|---|---|
| 5,699,108 A * | 12/1997 | Katayama et al. | ............... | 348/47 |
| 5,778,268 A * | 7/1998 | Inaba | ............... | 396/326 |
| 6,064,749 A * | 5/2000 | Hirota et al. | ............... | 382/103 |
| 6,483,555 B1 * | 11/2002 | Thielemans et al. | ......... | 348/745 |
| 6,549,650 B1 * | 4/2003 | Ishikawa et al. | ............... | 382/154 |

(Continued)

FOREIGN PATENT DOCUMENTS

EP     0 701 369 A1    3/1996

(Continued)

OTHER PUBLICATIONS

"Mathematical Analysis of Super-Resolution Methodology", IEEE Signal Processing Magazine, May 2003, pp. 62-74.

(Continued)

*Primary Examiner* — David L Ometz
*Assistant Examiner* — Quang V Le
(74) *Attorney, Agent, or Firm* — Harrington & Smith (57) ABSTRACT

The invention relates to electronic equipment. The equipment includes camera means for forming data from an object located in the imaging direction, in which case the said camera means include at least two camera units (CAM1, CAM2) and data-processing means, which are arranged to process the data formed using the camera means, in a manner corresponding to the currently selected imaging mode, to form image information. In the equipment, the mutual position of the camera units (CAM1, CAM2) relative to each other is arranged to be altered to correspond to the current imaging mode.

19 Claims, 7 Drawing Sheets

U.S. PATENT DOCUMENTS

| | | | |
|---|---|---|---|
| 6,809,771 B1* | 10/2004 | Hamaguchi et al. | 348/335 |
| 7,102,686 B1* | 9/2006 | Orimoto et al. | 348/375 |
| 2001/0026249 A1* | 10/2001 | Bell et al. | 345/9 |
| 2003/0214712 A1 | 11/2003 | Yano et al. | 359/466 |
| 2005/0089212 A1* | 4/2005 | Mashitani et al. | 382/154 |

FOREIGN PATENT DOCUMENTS

| | | |
|---|---|---|
| EP | 0 830 034 A1 | 9/1997 |
| EP | 1 357 726 A1 | 10/2003 |
| EP | 1 379 063 A1 | 1/2004 |
| EP | 1 379 073 A1 | 1/2004 |
| JP | 11-355624 | 12/1999 |
| KR | 1998-0085622 | 5/1998 |

OTHER PUBLICATIONS

"High-Resolution Images from Low-Resolution Compressed Video", IEEE Signal Processing Magazine, May 2003, pp. 37-48.

"Computer Vision Applied to Super Resolution", IEEE Signal Processing Magazine, May 2003, pp. 75-86.

"Super-Resolution Image Reconstruction: A Technical Overview", IEEE Signal Processing Magazine, May 2003; pp. 21-36.

"Multi-Objective Super Resolution: Concepts and Examples", IEEE Signal Processing Magazine, May 2003, pp. 49-61.

* cited by examiner

ELECTRONIC EQUIPMENT AND METHOD IN ELECTRONIC EQUIPMENT FOR FORMING IMAGE INFORMATION AND A PROGRAM PRODUCT OR IMPLEMENTATION OF THE METHOD

TECHNICAL FIELD

The invention concerns electronic equipment, which includes
camera means for forming data on an object located in the imaging direction, in which case the said camera means include at least two camera units and
data processing means, which are arranged to process the data formed by the camera means, according to the currently chosen imaging mode of the equipment, in order to form image information.

In addition, the invention also concerns a system, method, program product, and camera module.

BACKGROUND

Electronic equipment, for example, portable equipment, is nowadays equipped with one camera unit. Such an arrangement is in fact quite adequate for performing ordinary still and video imaging with moderate resolution. However, along with the development, future equipment and their circle of users will demand development of new manners of imaging.

One example of these new imaging manners is 3D imaging. Equipment to be launched on the markets in the future will have three-dimensional displays, or the equipment will allow performance of 3D applications. Contents must also be created for these, so that the new characteristics of the displays and applications can be utilised fully. As is known, the informative capacity of 3D images is superior to, for example, the informative capacity of traditional 2D images, which for its part adds to the interest paid to them.

According to the state of the art, a 3D image can be formed of two separate images taken at the same time. If the imaged object is immobile, the user may take two separate images by moving the equipment slightly to the left or to the right between taking the images. Instead, if the imaged object is in motion, such an imaging method is rather unsuitable. The location of the camera is also of essential importance to 3D camera imaging based on successive shots. If the location of the camera is not sufficiently exact, so-called artefacts, i.e. undesirable distortions, will then appear in the image. Rough outlines are one example of these.

Panorama imaging is an other example of the new imaging manners. According to the state of the art, a panorama image can be formed by using a special lens arrangement. However, the lens arrangement constitutes a very complicated and even cost-intensive whole, where the size factors of portable equipment also cause limitations of their own. If the panorama functionality would be arranged in the equipment by using a lens system, then at least it would have the effect of increasing the height of the equipment. Known portable electronic equipment also provided with an integrated camera functionality have so far entirely lacked the panorama imaging functionality.

Furthermore, known kinds camera means and especially the image sensors they apply are only capable of a certain and quite limited image resolution. This poses a problem to do with the resolution of the image, and the problem cannot be solved at least with image sensors of the known kinds. If improved resolution is desired, this requires sensors of a better quality, but applying these will raise the consumer price of the equipment. And furthermore, if e.g. enlargements are to be made of the image, the limited resolution will cause problems, for example, in the form of granularity.

European patent application number 1 357 726 (NEC Corporation) discloses a mobile station, in which there are two cameras arranged on the same side as the display component. The display component is arranged to be turned between horizontal and vertical positions. In this case, the two cameras are intended to produce 3D image information. The camera arrangement described, in which the mutual position of the cameras relative to each other, is fixed, is not, however, the best possible for producing 3D image information, not it is suitable for implementing more diverse imaging modes.

SUMMARY

The present invention is intended to create a new type of electronic equipment equipped with camera means, and a method in electronic equipment for forming image information. The characteristic features of the equipment according to the invention are stated in the accompanying claims. For example, according to an embodiment of the invention, disclosed is an electronic equipment, which includes camera means for forming data on an object located in the imaging direction, in which case the camera means includes at least two camera units. The electronic equipment also includes data processing means, which are arranged to process the data formed by the camera means, according to the currently chosen imaging mode of the equipment, in order to form image information. In the equipment, the mutual position of the camera units relative to each other is arranged to be altered to correspond to the current imaging mode.

According to another embodiment of the invention, disclosed is a method in electronic equipment for forming image information, in which camera means are used to perform imaging of an object in the imaging direction. The camera means include at least two camera units, the data formed by which is processed by processing means, in a manner according to the currently selected imaging mode, in order to form image information. In the method, the mutual position of the camera units relative to each other is altered, to correspond to the current imaging mode.

In addition, the invention also relates to a system, a program product, and a camera module, the characteristic features of which are stated in the claims. For example, according to an embodiment of the invention, disclosed is a system for forming image information, which includes camera means for forming data on an object located in the imaging direction, in which case the camera means includes at least two camera units. The system also includes data processing means, which are arranged to process the data formed using the camera means, in a manner according to the currently selected imaging mode, in order to form image information. The mutual position of the camera units relative to each other is arranged to be altered to correspond to the current imaging mode.

In further accordance with an embodiment of the invention, a program product for implementing a method according to the invention is disclosed. The program product is arranged to receive data, formed using camera means, on an object in the imaging direction and to process it in a manner according to the selected imaging mode, to form image information, and which data include data formed by at least two camera units aimed in the imaging direction, which data the program product is arranged to process in a manner according to the selected imaging mode. The program product includes one or more components for detecting the mutual position of the camera units.

Also disclosed in accordance with an embodiment of the invention is a camera module for forming data from an object in the imaging direction. The camera module includes at least two camera units aligned in the imaging direction, the mutual position of which relative to each other is arranged to be altered to correspond to the selected imaging mode.

In the solution according to the invention, arranged in the equipment are two camera units that can be aimed in the imaging direction, the mutual position of which relative to each other is arranged to be able to be altered to correspond to the current imaging mode. Aiming relative to the object being imaged can be at least partial or even almost full, depending on the chosen imaging mode. Here, the term full aiming refers to the fact that the camera unit is aimed straight at the object. According to the method, the camera units can be used for performing imaging essentially simultaneously. In this context, imaging essentially simultaneously refers to the fact that imaging is performed entirely simultaneously or, on the other hand, also imaging, in which the camera units are used to capture image information sequentially with an inestimably short delay between shots. Such a very short delay may be possible, for example, when the imaged object remains completely stationary.

According to a first embodiment, the camera units may be arranged essentially separately from one another, so that they are located, for example, at a fixed distance from each other. According to another embodiment, the camera units may also be movable. In that case, the distance between them can be adjusted and they can be, for example, turnable relative to each other, in order to allow the desired imaging mode. In a surprising way, the solution according to the invention provides even several different imaging modes. This is achieved by rotating the cameras relative to each other. It is also possible to be able to alter the mutual distance between the cameras, besides, or instead of turning them, in order to correspond to the current imaging mode.

Further, according to a third embodiment, the camera units may be connected to each other in an established manner. In this context, the connection can also be understood quite broadly, such as, for example, as a mechanical connection or a data transmission connection.

The invention permits several imaging modes. A single output image can be constructed from the sets of image data formed by two camera-module units that are separate from each other.

Of possible imaging modes the formation of 3D images can be mentioned first. 3D images are brought about without any such equipment transferring actions between the images, which have earlier been required, for example, in 3D imaging with one camera unit.

High-resolution images are another example of an imaging mode made possible by the invention. According to one embodiment, these provide even twice the resolution in comparison with the known one-sensor imaging technique.

A third example of the imaging mode that can be achieved is wide-range imaging, that is, panorama images. With the invention such can be brought about without any special known lens arrangement like the known one in single-sensor solutions. According to one embodiment, in panorama imaging, the imaging angle between sensors may be adjusted, for example, by the user. The resolution feature improved in some respects may also be applied to panorama imaging.

To make these three embodiments possible, the camera units can be moved in a chosen manner relative to one another, to allow each imaging mode. The movement of the cameras can involve altering their alignment relative to each other, so that the camera can be turned relative to each other, or the distance between them can be altered. According to one equipment embodiment, the adjustment of the distance between the camera units can be synchronized with the adjustment of the imaging angle between the camera units. The adjustment of the distance will then also adjust the angle between the camera units.

The invention further relates not only to a system, but also a program product, in order to identify the selected operating mode from the mutual position of the camera units and to form image information according to the selected operating mode from the data provided by the camera units. According to one embodiment, the program product includes a functionality, which can be used for combining at least partly data formed on the imaged object, such as, for example, for panorama imaging. Data can also be combined fully, thus allowing super resolution imaging. The 3D imaging mode also requires algorithms of its own in order to process the data in the manner required by the mode.

Integration of the method according to the invention both in present-day electronic equipment and in those being planned can be performed quite simply. According to one embodiment, the equipment can also be provided additional with second camera unit only, with the control functions of the camera units and also with some program modules in order to allow different imaging modes.

Other characteristic features of the electronic equipment, method, system, program product, and camera module according to the invention are apparent from the accompanying claims, while additional advantages that can be achieved are itemized in the description portion.

In the following the invention, which is not limited to the embodiments presented hereinafter, will be described in greater detail referring to the appended figures, wherein

DETAILED DESCRIPTION

Nowadays, many electronic equipment 10 often includes camera means. Besides digital cameras, examples of such equipment are mobile stations, PDA (Personal Digital Assistant) equipment and other such "intelligent devices of communication", of which equipment of the Palm type can be mentioned as an example. The concept of "electronic equipment" can in fact be understood even quite largely in this context. For example, it may be such a piece of equipment, which is provided with or can be provided with a digital imaging ability. In the following, the invention will be described by way of example in connection with a mobile station 10.

Figure 1:
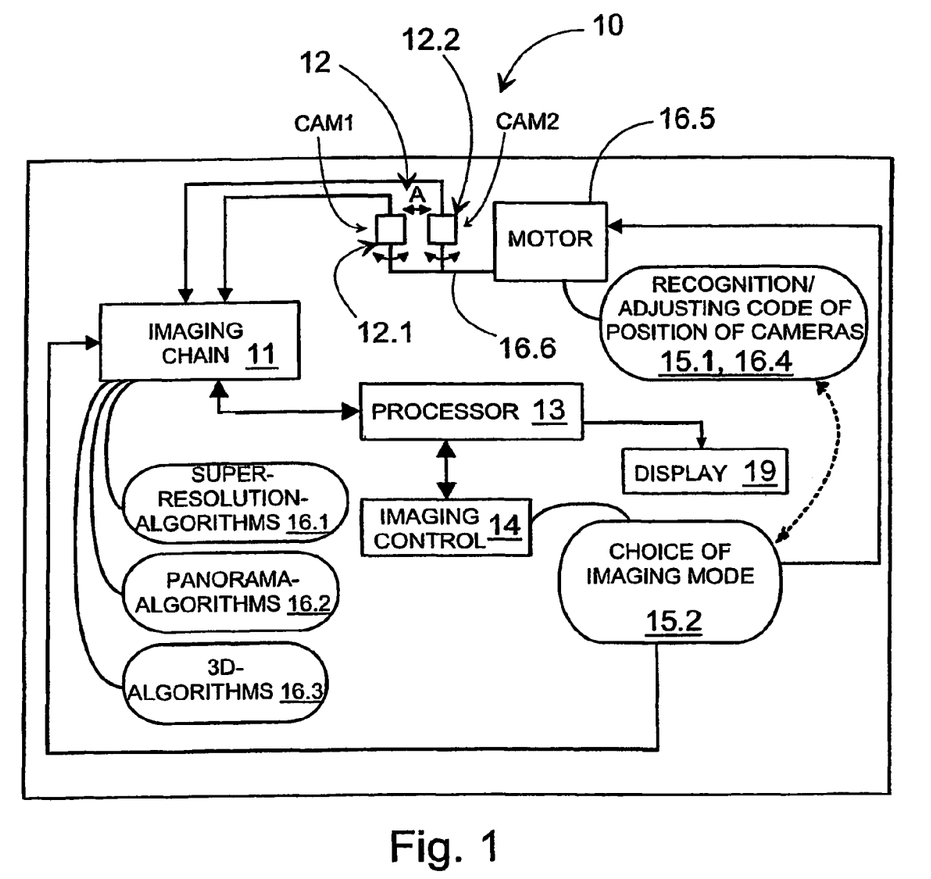
FIG. 1 shows a rough block diagram of an example of the equipment according to the invention.

FIG. 1 shows a rough schematic example of functions in equipment 10 as regards their parts to do with the invention, which also constitute the system at the same time. Equipment 10 may include the functional parts shown in FIG. 1, which are of a known kind as such and of which the camera means 12 may be mentioned as parts essential for the implementation of the system according to the invention.

The camera means 12 and the imaging chain 11 arranged in their connection using a data transmission interface may consist of components of a kind known as such (CCD, CMOS) and of program modules, which are used for capturing and processing still and/or moving image data and for using it to form image information, which can be examined, for example, on the possibly provided display 19 of the equipment 10 or image data for storing in the storage medium of equipment 10 in a chosen storage format. The imaging chain 11 performing processing of the image data is used to process in an established manner the data formed by the camera means 12 on an object located on the imaging direction, according to the imaging mode or imaging parameter settings chosen at each time.

The general term of "camera means" is used in the case according to the invention to indicate at least two camera units CAM1, CAM2 and all such technology in general, which usually relates to camera modules when carrying out digital imaging. The camera means 12 may be in a fixed location in connection with the equipment 10 or they may also be attached to the equipment 10 in a manner allowing removal.

In the solution according to the invention, the camera means 12, the position of which relative to each other can be altered to correspond to the currently selected imaging mode now include at least two camera units CAM1, CAM2. The camera units CAM1, CAM2 are directed, for example, relative to the equipment 10 mainly in the same imaging direction (the arrows in FIGS. 2-5). The direction of camera units CAM1, CAM2 may be such that they are at least partly towards a common direction of exposure. Hereby they can cover at least partly one another's imaging sectors. Both camera units CAM1, CAM2 may hereby have their own physically separated and independent image sensor 12.1, 12.2. On the other hand, such an arrangement could also be possible, where both camera units CAM1, CAM2 are essentially in one and the same modular camera component, however, even then forming essentially two camera units.

The camera units CAM1, CAM2 or in particular the image sensors 12.1, 12.2 including to them may be identical and may be arranged in the equipment 10 on its same side towards an exposure direction, which is at least partly the same for them both. In addition, sensors 12.1, 12.2 may be located on the same horizontal level, whereby they are located side by side, when the equipment 10 is held in its basic position (being in a vertical position, for example, in the case of a mobile station).

Furthermore, the equipment 10 may include a display part 19 of a kind known as such or of a kind being still under development, which is used to display information for the user. The camera units CAM1, CAM2 can then be on the opposite side of the equipment 10 to the display component 19, so that they mainly point in the common imaging direction. Of course, the cameras CAM1, CAM2 can also be on the same side as the display component 19, as the invention in no way prevents this, nor does it prevent an arrangement, formed of at least two camera units CAM1, CAM2, according to the invention, being arranged on both sides of the equipment.

However, display 19 is in no way compulsory from the viewpoint of the invention. However, the existence of the display 19 achieves the advantage that an selected imaging object that is in the opposite direction to the display component 19 can then be examined on the display 19 functioning as a viewfinder, for example, before carrying out the imaging. Monitoring cameras, to which the invention may also be applied, can be mentioned as an example of an arrangement having no display. In addition, the equipment 10 also includes a processor functionality 13 including functionalities for controlling the different functions 14 of the equipment 10.

In the equipment 10 according to the invention, camera units CAM1, CAM2 are mainly operating at the same time when carrying out imaging. According to a first embodiment, this means an imaging instant trigging into action essentially at the same moment of time. According to another embodiment, even a short time difference may be permitted in the imaging instants, for example, if this is permitted by the object to be pictured. Hereby the equipment's 10 imaging chain 11, for example, need not necessarily have so an efficient data processing ability compared, for example, with a situation, where imaging would be performed exactly at the same time with both image sensors 12.1, 12.2.

Figure 2:
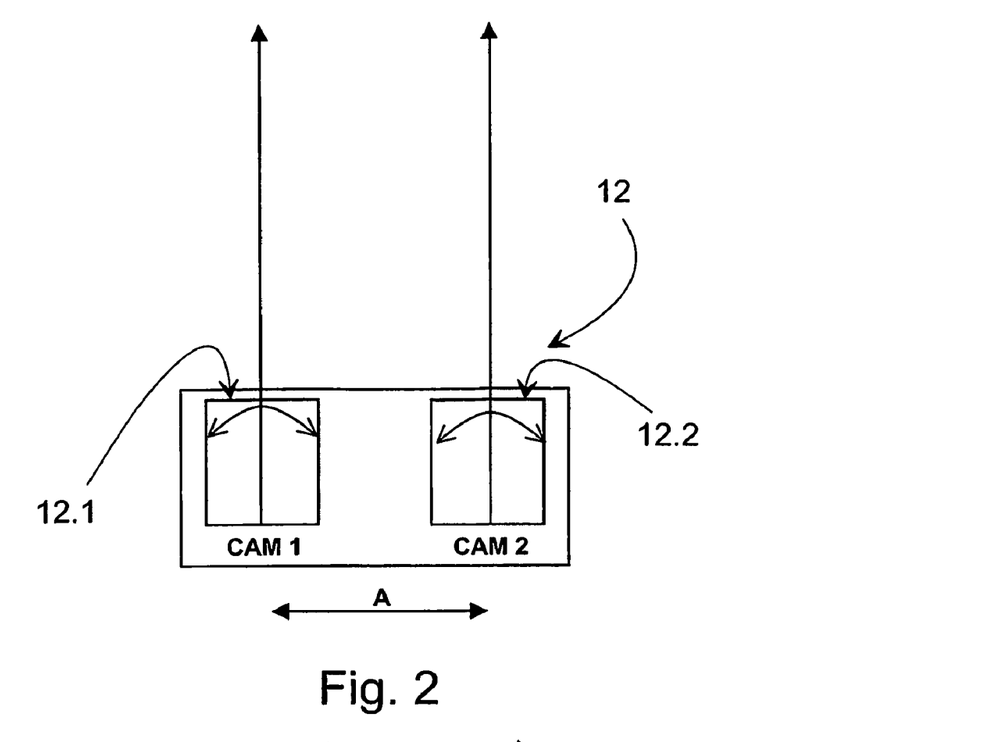
FIG. 2 shows a principle view of camera units in equipment according to the invention.

FIG. 2 shows the invention further on a principal level and still also referring to FIG. 1. The position of the camera units CAM1, CAM2 relative to each other is of a kind that can be changed. The mutual position can, according to one embodiment, be changed by the action of the user, by manually moving at least one camera unit CAM2. According to another embodiment, the movement of the camera units CAM1, CAM2 can also be achieved, for example, using servomotors. In general too, the camera units CAM1, CAM2 can able to be moved relate to each other to a setting corresponding to the current imaging mode. Instead of camera units CAM1, CAM2 that are arranged to be movable, the device case too may permit the mutual position of the camera units CAM1, CAM2 to be altered to correspond to the current imaging mode. In that case, the device case can be arranged to be such, that the camera units are each in their own case block. The case blocks can be arranged in each other in such a way that the position of the camera units relative to each other, for example, the distance and/or the angle between them can be changed relative to each other. Thus, both camera units CAM1, CAM2 can be in their own case block, which case blocks can be arranged to move telescopically relative to each other (adjustment of the distance between the camera units CAM1, CAM2) and/or to turn around a Hinge point (adjustment of imaging angle).

One example of the moving of the camera units CAM1, CAM2 is ability of the camera units CAM1, CAM2 to be aimed to permit different imaging modes in the equipment 10. According to one embodiment, this can be handled by using program code 16.4 in the device 10, by means of which the servos adjusting the distance and/or angle between the cameras CAM1, CAM2 are controlled. The aiming of the cameras CAM1, CAM2 can be performed, for example, by turning them relative to each other. The turning direction can be chosen quite freely. Furthermore, the distance A between camera units CAM1, CAM2 may be fixed while imaging is carried out. Distance A may be chosen based, for example, on the size of image sensors 12.1, 12.2 or on size factors of the equipment 10. Of course, the distance too can be adjustable by the user, or automation, as will be described later.

Figure 3:
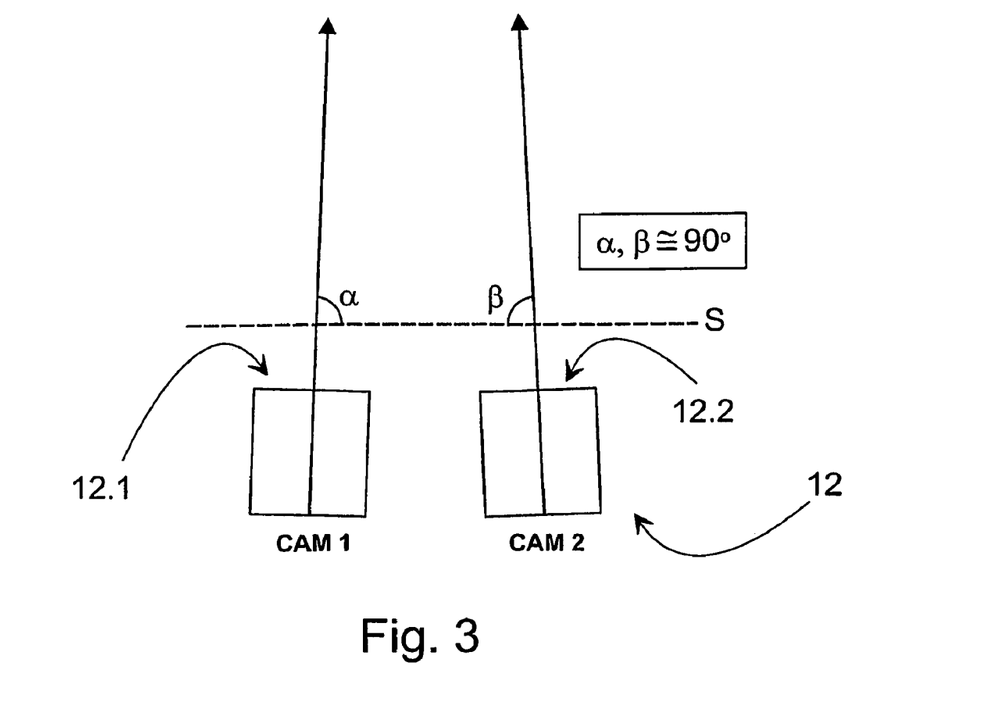
FIG. 3 shows a principle view of 3D imaging.

FIG. 3 shows a first imaging mode embodiment resulting from the possibility of turning the camera units CAM1, CAM2. According to this, the sensors 12.1, 12.2 can be turned around in an established manner towards each other in such a way that when imaging is performed they will be located at a constant distance A from each other. According to one embodiment, the turning angle of sensors 12.1, 12.2 and the direction of their imaging range may be used to simulate the principles on which the human eye functions. Hereby, of the straight lines or vertical planes imagined as passing through the central point of image sensors 12.1, 12.2 at least the angle α, β of one in relation to a horizontal plane S in the imaging direction can be slightly less than 90°, or exactly 90°. The embodiment in question allows 3D imaging. A particular advantage, especially relating to 3D imaging, which is achieved through the rotatability of the camera units CAM1, CAM2 relative to each other, is the adjustment of the stereoscopic effect. Thus, the image sensors 12.1, 12.2 can be aimed at the correct point, so that a result with a better depth effect will be achieved. The final data formed of the imaged object by both image sensors 12.1, 12.2 is processed by using a chosen data processing algorithm 16.3, which allows forming 3D image information of the data (IMAGE_3D, in FIG. 8a). The data of the image sensors 12.1, 12.2 are dephased relative to each other.

Furthermore, if the equipment 10 is provided, for example, with a special 3D display, the viewing direction of camera sensors 12.1, 12.2 can be adjusted in order to minimize possible distortions, such as, for example, artefacts. Identification and remedying of artefacts may also be done by a program 16.3.

Figure 4:
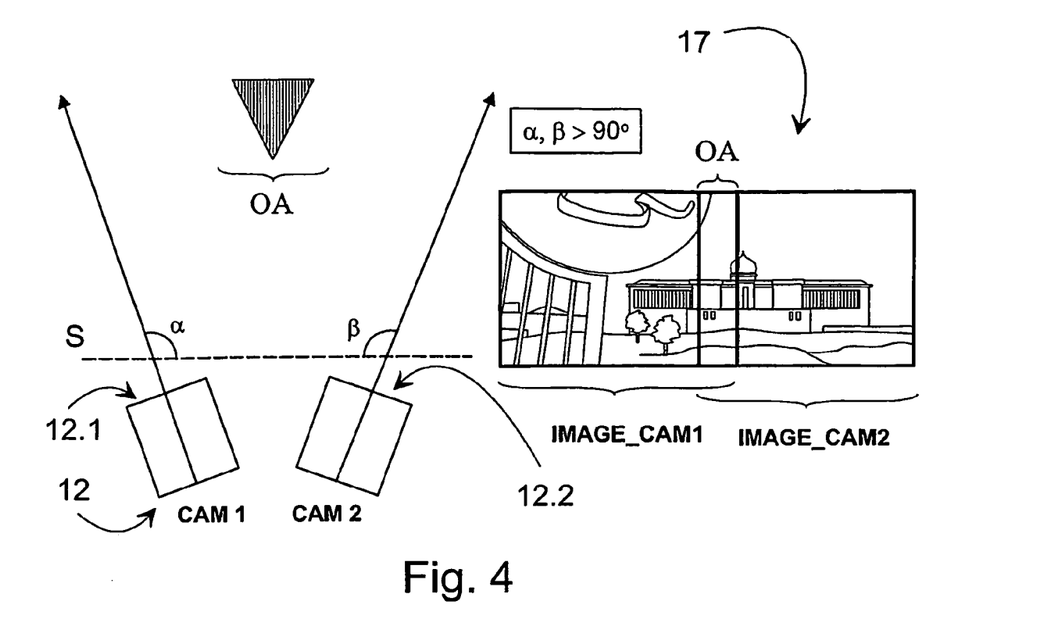
FIG. 4 shows a principle view of panorama imaging.

According to another embodiment shown in FIG. 4, the image sensors 12.1, 12.2 can also be turned in a protruding manner in relation to one another, that is, away from each other. Hereby, the corresponding angle α, β of straight lines or vertical planes imagined in the foregoing as passing through the image sensor 12.1, 12.2 in relation to the horizontal plane S will be bigger than 90° (or at least one of them). Hereby the straight lines imagined as passing through the sensors 12.1, 12.2 will intersect on the side opposite to the exposure direction of image sensors 12.1, 12.2, that is, behind them. The mutual turning angle of image sensors 12.1, 12.2 may be set to be such that the desired imaging range is brought into the imaging view, which can be examined with the view finder 19. The aiming can also be performed by the action of the user, as will be described later.

In the panorama/wide-panorama imaging mode, the turning angle of the image sensors 12.1, 12.2 is limited by the demand for partial overlapping of images formed by using the sensors 12.1, 12.2. Hereby the data processing equipment 16.2 is used to combine data formed by the camera units CAM1, CAM2, thus to combine the data at least partly with each other in such a way that at least a part of the edge areas of both partial images IMAGE_CAM1, IMAGE_CAM2 are positioned on top of each other. In a case according to the embodiment, the image information of the right-hand edge of the left image sensor 12.1 and the image information of the left-hand edge of the right image sensor 12.2 is positioned in an overlapping manner along the required area OA.

The size of area OA is affected, for example, by the extent of the range of the desired panorama image. The larger the scope is made in panorama imaging, the smaller are the areas OA placed to overlap. The final image information is sewn to form an image 17 of the panorama type with double resolution at least at those intermediate image information areas OA of camera units CAM1, CAM2, which are positioned on top of each other (IMAGE_F in FIG. 8c). The program code 16.2 can be used to identify the common area OA from both images IMAGE_CAM1, IMAGE_CAM2, according to which the images are then merged. One example of the size of a panorama image is 2560*960. Panoramic imaging permits, for example, image format ratios of 16:9 and 16:6.

Figure 5:
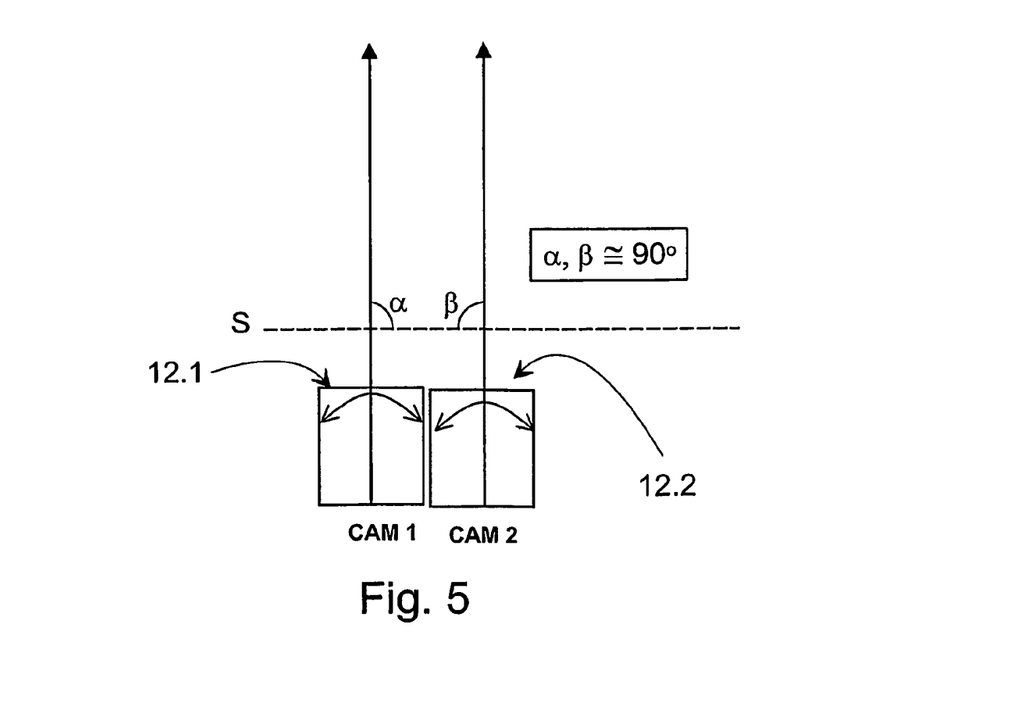
FIG. 5 shows a principle view of imaging improving image resolution.

FIG. 5 shows one more embodiment, the third one, also allowed by the arrangement according to the invention. Here both the adjacent image sensors 12.1, 12.2 are pointing at right angles forwards in the same direction, whereby the angle α, β between a straight line imagined as passing through them and the horizontal plane in the imaging direction is 90° by and large, whereby they are in parallel. The image sensors are now closer to each other than in, for example, the 3D-imaging mode. The embodiment allows an essential improvement of the resolution of image information. In this embodiment, too, the image data formed by both image sensors 12.1, 12.2 is placed on top of each other in the data processing equipment 16.1 of equipment 10, for example, by one or more algorithms performed by a program, in consequence of which pictures of considerably higher resolution are obtained compared with the conventional single-sensor implementation (IMAGE_S_R, in FIG. 8b). If the resolutions of the image sensors 12.1, 12.2 are, for example, in the order of three megapixels, then a six-megapixel image can be constructed from the sets of data formed by both of them together.

Even generally, "Overlapping-algorithm implementations" for forming both panorama images and also images with a higher pixel density are obvious to the professional in the art, so they will not be described any further in this context. 3D algorithmic implementations can also be brought about in numerous different ways. Some references to literature relating to these algorithms are listed in a list of references on the last page of this specification.

For the purpose of turning the camera units CAM1, CAM2, they may also be connected to each other. In this case, according to a first embodiment, connecting means a mechanical connection, which can be used to synchronize the turning motion of the image sensors 12.1, 12.2 when changing the imaging mode or else when doing adjustments. Hereby the equipment 10 may include a special arm arrangement 16.6 (FIG. 1), or some other similar movement mechanism, by means of which both image sensors 12.1, 12.2 are turned, for example, through a set of shafts arranged for them, using a single turning device 16.5. On the other hand, both image sensors 12.1, 12.2 may also have a turning device of their own (not shown), which may be controlled independently of one another. The equipment 10 can also include a servo arrangement for altering the distance between the camera units CAM1, CAM2.

Figure 6:
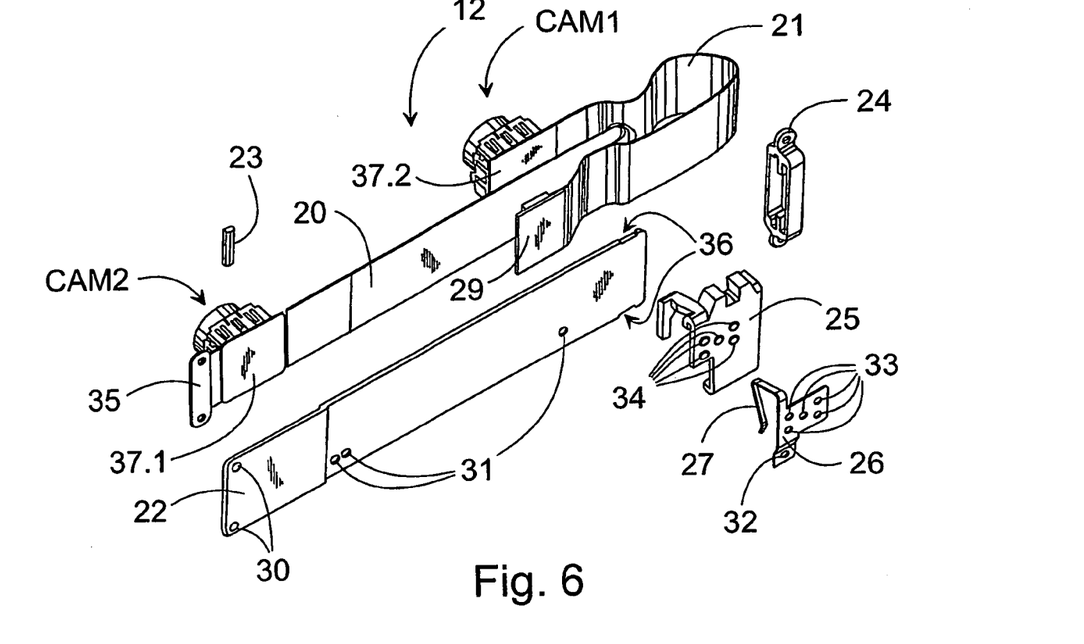
FIGS. 6 and 7 show an example of a practical implementation of a camera-module embodiment.
Figure 7:
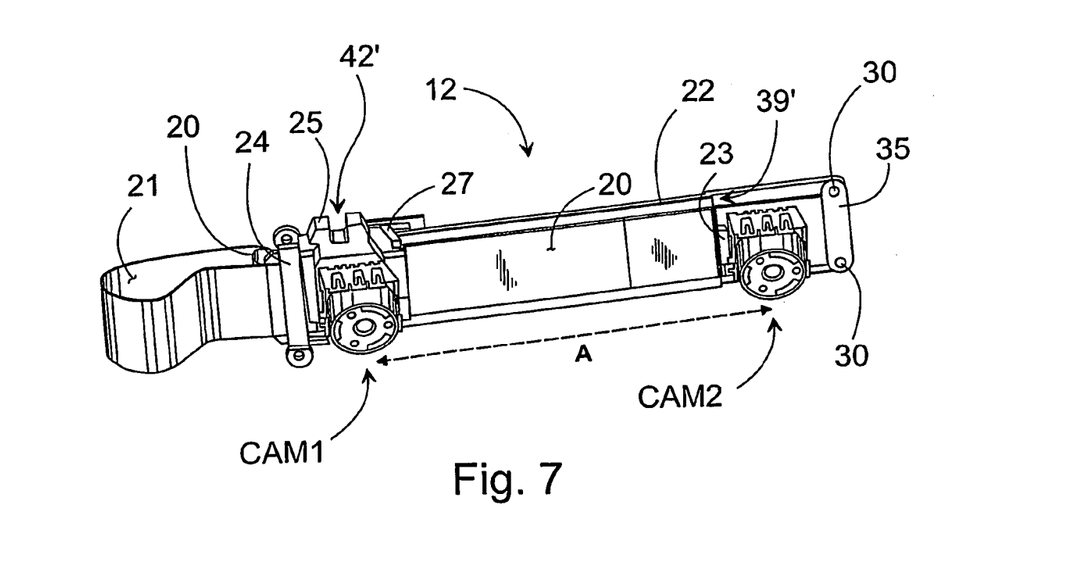

FIGS. 6 and 7 show an example of the camera arrangement 12 according to the invention. The use of such a simple camera mechanism permits linear movement for one camera CAM1 between positions according to specific imaging modes. In addition, the use of the same mechanism will also permit the camera CAM1, CAM2 to be aligned at a set angle to each other.

In this embodiment, the movement of the camera is implemented manually, i.e. the user moves at least one camera CAM1 to the location or position according to the desired imaging mode. As a result, the second camera CAM2 is also adjusted to a position corresponding to the imaging mode, provided that such an adjustment is demanded by the imaging mode. Motorized movement/turning is also possible besides manually performed movement/turning. According to one embodiment, turning can even be synchronized to take place when the distance between the camera units CAM1, CAM2 is adjusted.

In this case, the mechanism is formed by an FPC application (FPC, Flexible Printed Circuit). This includes two separate FPCs 20, 21 diverging from a single connector 29. The connector 29 can be, for example, a board-to-board connector, which can be connected to the equipment's 10 circuit board. The arrangement in question is also known from FPC technologies as an air-gap construction. A camera CAM1, CAM2 is connected to each FPC 20, 21. The connection can be made using, for example, an SMD socket. Of course, the cameras CAM1, CAM2 can also be connected directly to the FPC 20, 21. The FPCs 20, 21 can also have stiffeners 37.1, 37.2 under the sockets.

Figure 8A:
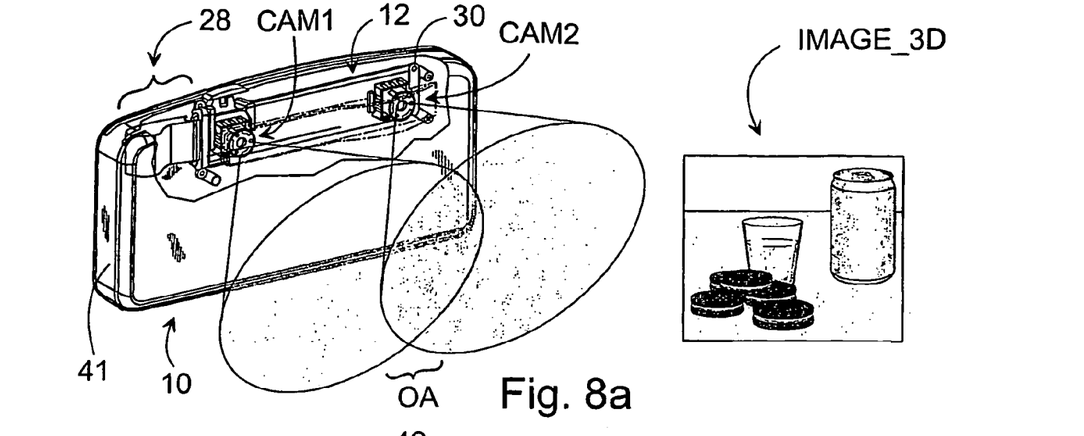
FIGS. 8a-8c shows equipment examples in different imaging modes.

One of the FPCs 20 can include a small stopper element 23 attached to it, which is in front of the stationary camera unit CAM2. The stopper 23 is used to stop the camera unit CAM1 that is arranged to move linearly next to the stationary camera unit CAM2. The stopper element 23 also permits the cameras CAM1, CAM2 to turn relative to each other, as described later. The stopper element 23 can be attached to the FPC 20, for example, using an adhesive. In addition, there can be a stiffener 35 at the end of the FPC 20. The stiffener 35 is used to connect one end of the FPC 20 to the metal chassis 22, for example, with an adhesive. There are holes 30 in the stiffener 35, for securing the camera module 12 by one end inside the equipment 10 (FIG. 8a).

The FPC structure 20, 21 is supported against a backing plate, for example, a plate 22 of sheet metal, over its longest dimension. In the metal sheet 22, there are mounting holes 30 and index-click holes 31. The plastic slider part 25, in which there is a heat staked sheet-metal spring 26, can be slid in the guides of the metal chassis 22, from one end of it to the other. The slider part 25 has grooves, which hold it in place and allow it to slide along the long sides of the metal chassis 22.

Figure 8B:
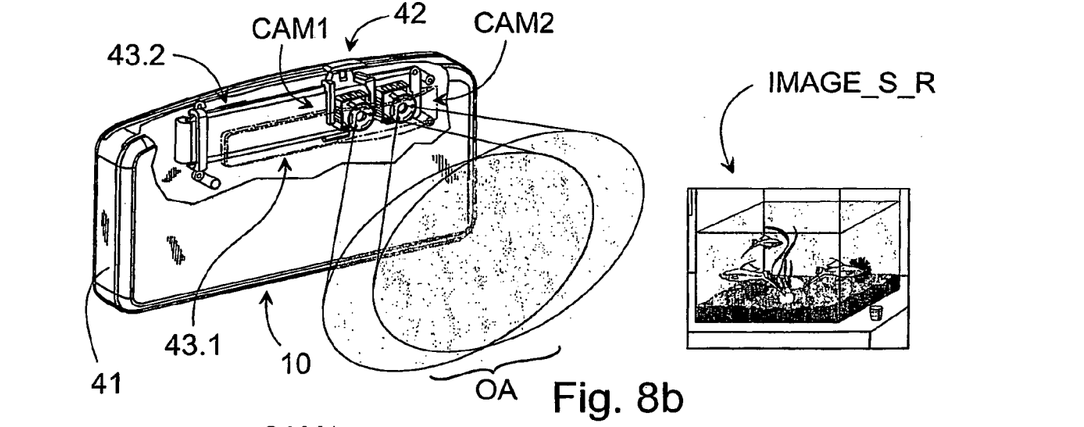

A finger button 42 protruding from the case 41 of the equipment is fitted to the slider part 25, for adjusting the distance between the camera units CAM1, CAM2 (FIG. 8b). There is a recess 42' in the slider part 25 for the finger button 42 (FIG. 7). By means of the finger button 42, the user can slide the moveable camera unit CAM1 either farther from, or closer to the camera unit CAM2 that is fixed in place. An elongated slot 43.2 is arranged for the finger button 42 in the upwards-facing case surface of the case 41 of the equipment 10 (FIG. 8b). An elongated slot 43.1 is also arranged in the imaging direction in the case 41, for the cameras CAM1, CAM2 (FIG. 8b). This can also have some kind of a shutter mechanism, by means of which the slot 43.1 can be closed, when the distance of the cameras CAM1, CAM2 from each other is altered, by moving the camera CAM1 linearly. Of course, the second camera unit CAM2 too can also be of a linearly moveable type.

A lightweight compression spring catch 27 and index-click patterning 32 are formed in the sheet-metal plate 26. The patterning 32, which can be in the form of dimples, is used to make the camera CAM1 arranged to move in the guides 22, locked in the desired positions to permit the various imaging modes. A dimple 32 location is arranged in such a way that it fits a counter-location 31, of which there are three in this example, arranged in the metal plate 22. During assembly, the sheet-metal plate 26 is attached to the plastic slider part 25, for example, using a heat-staking attachment. The openings 33 in the sheet-metal plate 26 are then aligned with the protrusions 34 in the slider part 25 by pressing the components 25, 26 together, after which the protrusions 34 are melted into the openings 33 and the sheet-metal plate 26 remains attached to the slider part 25.

After this, the free end of the module 12 can be closed using a plastic locking-cap element 24. The element 24 is attached to the metal chassis 22 by a snap lock. For this purpose, there are small recesses 36 in the edges of the end of the metal chassis 22, into which the element 24 is locked in place during assembly. There are guide openings for the FPC 20, 21 in the locking element 24, as can be clearly seen in FIG. 6. The cap element 24 also controls the sliding of the FPC 21 while it moves. Thanks to the element 24, the FPC 21 protrudes away from the arrangement, and does not detrimentally fold in front of the camera CAM1. The element 24 also guides the FPCs 20, 21 in a controlled manner to the rear of module 12 and to the equipment circuit board connector. There are holes 30 in the cap element 24 and in the metal chassis 22 for attaching the camera module 12 to the internal/case structures 41 of the equipment 10. The components belonging to the arrangement can be installed and attached to each other, for example, by gluing or a similar arrangement that adheres to each other, as well as by spring locks. The cameras CAM1, CAM2 can be attached to the FPC 20, 21, either directly using bonding technologies (AFC), by direct soldering, or through a camera socket.

Figure 8C:
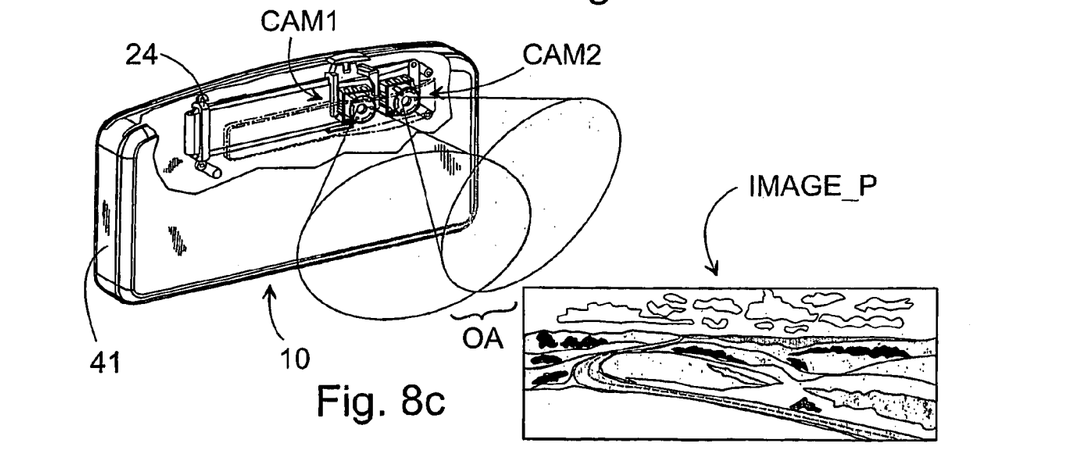

FIGS. 8a-8c show examples of the camera device application shown in FIGS. 6 and 7, in various imaging-mode arrangements. FIG. 8a shows the camera arrangement in a case permitting 3D imaging. The camera units CAM1, CAM2 are now at a distance from each other (for example, 40-60 mm). In it, two images with a slight mutual offset OA (for example, 40-60 mm) are combined in the display 19 to form a 3D image IMAGE_3D, using a program algorithm 16.1. Instead of a conventional LCD display, the display 19 can also be a 3D type, when a even more realistic 3D effect will be achieved.

Figure 9:
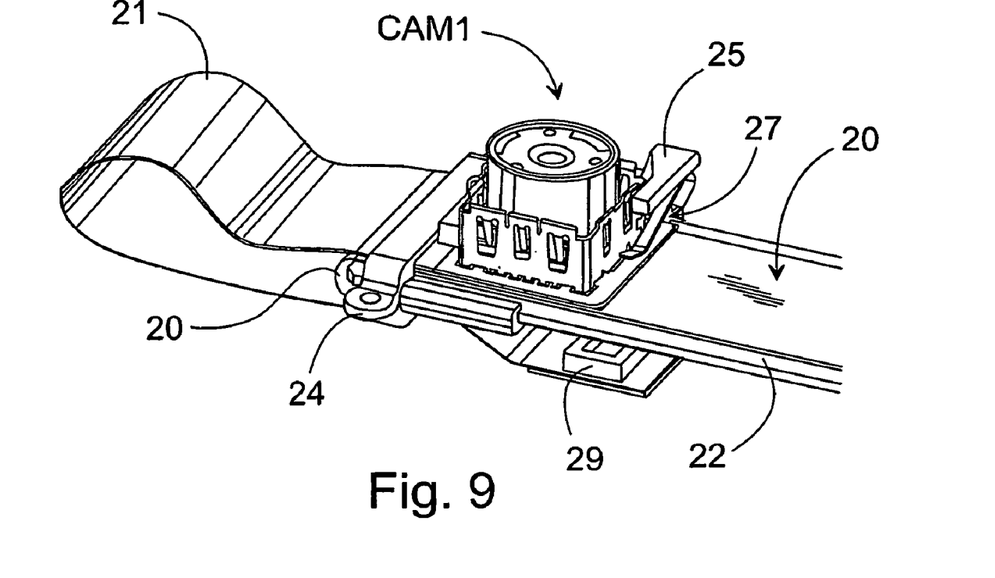
FIG. 9 shows a camera unit arranged to move more precisely in 3D-imaging mode.

As can be seen from FIG. 9, thanks to the small lightweight compression spring member 27 the camera CAM1 remains correctly aligned, pointing straight forward. Thus the direction of the camera CAM1 is essentially at an angle of 90 degrees to the FPC 20, 21. The spring 27 presses the camera CAM1 towards the FPC 20 from the edge that rises, when the cameras CAM1, CAM2 are brought into the panorama imaging mode that is described later. The FPCs 20, 21 come out of the arrangement behind the plastic slider part 25. Most of the FPC 21 that is on top has now been pushed out of the module 12. The plastic locking cap 24 controls that the FPC ribbons 20, 21 remain as a compact package within the case structure 41 of the equipment 10. There must be sufficient space 28 within the equipment 10 for the FPC ribbon loop 21 of the camera unit CAM1, which camera unit CAM1 moves linearly, relative to the stationary camera CAM2 (FIG. 8a). The length of the linear path of the camera CAM1 can be, for example, 40-60 mm.

Figure 10:
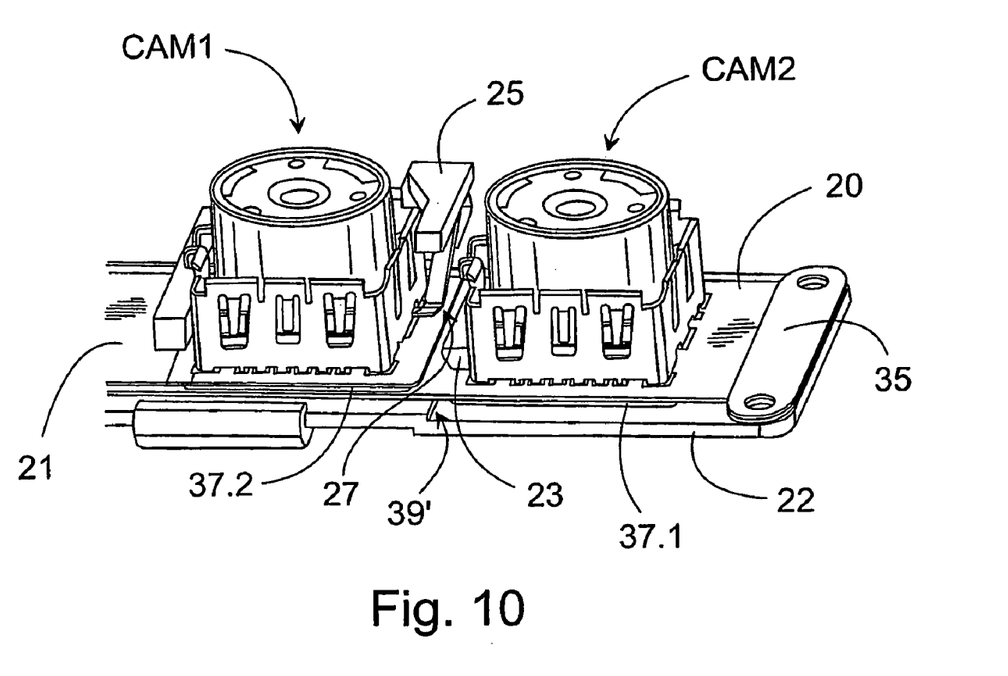
FIG. 10 shows camera units in super-resolution imaging mode.

FIG. 8b shows the situation, in which the camera unit CAM1 has been moved by sliding it linearly along the guides in the metal chassis 22 to a place in the immediate vicinity of the stationary camera CAM2. The sliding takes place using the finger button 42, when the plastic slider part 25 slides along the guides formed by the metal chassis 22. Super-resolution imaging is then made possible. A six-megapixel image IMAGE_S_R can now be constructed from two, for example, three-megapixel images using program code 16.2. FIG. 10 shows this super-resolution camera arrangement in slightly greater detail. The lightweight compression spring catch 27 holds the alignment of the moving camera CAM1 essentially parallel to that of the camera CAM2 arranged to be fixed in place. Thus, the angle of both cameras CAM1, CAM2 is essentially 90 degrees relative to the FPCs 20, 21. As can be seen from FIG. 8b, the cones of the cameras CAM1, CAM2 coincide substantially.

FIG. 8c shows a situation, in which the cameras CAM1, CAM2 can be used to produce panorama/wide panorama images IMAGE_P. In it, two images with a 4:3 format can be stitched together using code 16.3, resulting in a panorama image IMAGE_P with a 16:9 or 16:3 format. In this embodiment, the alignment of the camera CAM1 is not parallel with that of the camera CAM2 arranged to be fixed in place, instead a predetermined angle is formed between the imaging directions of the cameras CAM1, CAM2.

Figure 11:
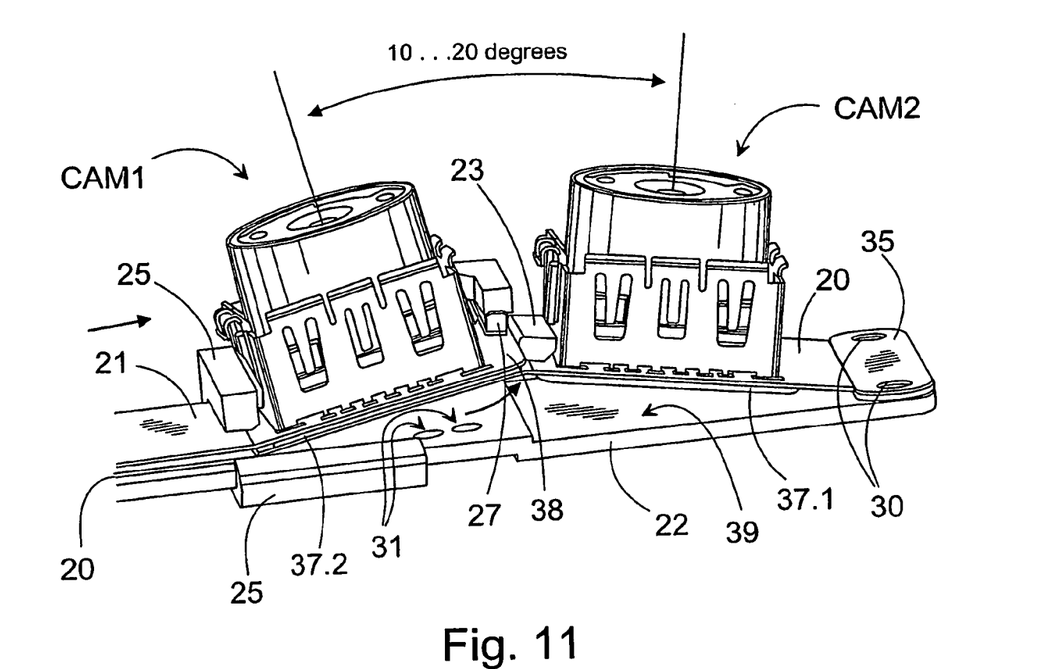
FIG. 11 shows camera units in wide-panorama imaging mode.

FIG. 11 shows the position of the cameras CAM1, CAM2 in slightly greater detail in this panorama-imaging situation. When the camera CAM1 is pushed farther towards the camera CAM2, which is arranged fixed in place, the opposing edges of the camera units CAM1, CAM2 are made to rise upwards off the surface of the FPC 20, 21, as shown in FIG. 11. The stiffener 37.2 at the rear of the camera CAM1, which is arranged to move, presses against the plastic retainer 23 on the front side of the stationary camera CAM2, resulting in the structure being bent upwards. The edge of the retainer 23 facing the stiffener 37.2 can be bevelled, which will help the cameras CAM1, CAM2 to take up this angled position. The bending takes place by the cameras CAM1, CAM2 turning to the set angle relative to each other and pointing slightly away form each other. The angle of turning of both cameras CAM1, CAM2 can be in the order of 10-20 degrees. The FPCs 20, 21 of the cameras CAM1, CAM2 act as foil hinges that permit turning. There is a small free loop in the FPC 20 of the stationary camera CAM2, at its locking-cap 24 end (FIG. 9), which permits a similar change in angle for the camera CAM2 as well. The lightweight compression spring 27 of the camera CAM1 also bends upwards. When the camera CAM1, which is arranged to move, is moved away from the panorama arrangement, the spring catch 27 returns the alignment of the camera CAM1 to the FPC plane. The camera CAM2 then also returns to an alignment parallel with the camera CAM1.

FIG. 11 shows very clearly how the FPCs 20, 21 form layers in the arrangement, relative to the metal chassis 22. The figure also shows that there is a small recess 39 for the camera CAM2 in the metal chassis 22. The recess ends at a threshold 391, which corresponds approximately to the edge of the stiffener 37.1 of the camera CAM2. The turning of the camera CAM2 is also permitted by the bending of the FPC 20 on the side next to the stiffener 35. Excessive bending of the cameras is prevented by, among other things, bars in the slider member 25 (FIG. 11), which are on both edges of the camera CAM1. The bar remaining between the cameras CAM1, CAM2 prevents the spring catch 27 from rising too much while the bar on the other side of the camera CAM1 prevents excessive turning of the camera unit CAM1. The FPCs 20, 21 slide easily relative to each other, which for its part permits the cameras CAM1, CAM2 to move linearly closer together and farther apart from each other.

The module mechanism 12 described above can be assembled simply, using known assembly methods while the number of components remains reasonable. In addition, the production costs of the module 12, consisting of the mechanism and two, for example, three-megapixel cameras, are relatively economical, compared, for example, to a single six-megapixel camera, which does not even permit several different imaging modes. The mechanism can be easily installed in connection with the surrounding mechanical construction of the device. It has inbuilt mechanical and electrical interface connections to the circuit boards of the equipment 10. Among other things, these factors make the module suitable for mass production.

The indexed parking locations 31 for the camera CAM1, which is arranged to move linearly, ensure the correct distance and angle for the cameras CAM1, CAM2 in each selected imaging mode. In the metal chassis 22 of the module 12, there are holes, countersinking, or similar recesses 31 for each imaging mode, in which the protrusion 32 of the sheet-metal plate 26 in connection with the slider member 25, or more generally a catch, settles. Once the catch 32 has settled into the index recess 31 arranged for it, the slider element 25, and with it also the camera CAM1 attached to it, cannot slide along the slide guides formed by the metal chassis 22.

Because the turning of the camera units CAM1, CAM2 relative to each other is arranged to occur when the distance between the camera units CAM1, CAM2 is adjusted, as in a synchronized manner, the end user is required to carry out no operations at all, for example, to adjust the image angle of the cameras CAM1, CAM2. The alignment-angle-setting between the cameras CAM1, CAM2, which is adjusted through the simple linear movement, makes selection of the imaging modes easy, even without special motorized solutions.

The mechanical construction is a Plug&Play type camera module 12, which includes several of the manufacturing, assembly, and operating technological advantages referred to above.

The equipment 10 according to the invention also includes, for example, means 14, 15 implemented by program for controlling the imaging modes, for example, selecting or identifying it, and along with it for controlling the functions of the equipment 10 and for processing the image data formed by the camera units CAM1, CAM2. Selection can take place, for example, from the user interface of the equipment 10, or manually by the user. Once the desired imaging mode has been set, the equipment 10 can identify the mutual position of the camera units CAM1, CAM2 relative to each other (code 15.1) and select (code 15.2) and activate the required program function 16.1-16.3, for example, from the image processing chain 11 or alternatively from outside the integrated image processing chain 11. The storage medium of the equipment 10 may hereby include a set of commands 14 to be carried out in an established sequence by the processor 13 of the equipment 10, which commands bring about, firstly, placing of the image sensors 12.1, 12.2 in the position (code 16.4) required by the chosen imaging mode and, secondly, also processing of the raw data produced by the image sensors 12.1, 12.2 and its connection with one or more algorithms 16.1-16.3 to image information in accordance with the chosen and detected mode of use.

In the equipment 10, the invention makes possible arrangement of several different imaging modes with one camera unit application 12 including at least two camera units CAM1, CAM2. The equipment 10 may of course include more camera units. Besides real-time artefact-free 3D imaging, panorama images and images of essentially improved resolution are also brought about in a surprising manner. With conventional single-sensor arrangements it is at least not in any way easy to implement these with one single shot, such as the method according to the invention appears from the user's point of view. It should be understood that the images IMAGE_3D and IMAGE_S_R shown in FIGS. 8a-8c do not necessarily represent the best possible example of the type of images in question. In this connection, they should be understood as being only very much by way of examples.

It should be understood that the foregoing specification and the related figures are only intended to illustrate the pre-sent invention. The processing of image data in particular can surely be implemented in numerous different ways. Thus, the invention is not limited only to the embodiments presented above or to those defined in the claims, but many such different variations and modifications of the invention will be obvious to the professional in the art, which are possible within the scope of the inventive idea defined by the appended claims.

The invention claimed is:

1. An apparatus comprising:
  a camera module configured to form data of an object located in an imaging direction, said camera module comprising at least two cameras, where a mutual position of said at least two cameras is configured to be adjusted to correspond to a determined imaging mode and wherein the adjusting of the mutual position is configured such that altering mutual distance between the cameras is configured to cause turning of the cameras relative to each other, if the mutual position of the cameras do not correspond to the determined imaging mode, and
  a processor configured to process the data formed by the camera module, according to the determined imaging mode, in order to form image information, the apparatus further comprising a mechanical connection between the cameras, wherein the mechanical connection is configured to cause the turning of the cameras relative to each other to correspond to the current imaging mode in response to the mutual distance between the being altered.

2. The apparatus according to claim 1, wherein the mutual position of the cameras relative to each other is configured to be altered by the cameras being manually moved by the user.

3. The apparatus according to claim 1, which additionally includes a display component configured on one side of the apparatus, wherein the cameras are configured on the opposite side of the apparatus relative to the display component.

4. The apparatus according to claim 1, wherein the cameras are connected to each other.

5. The apparatus according to claim 1, wherein the processor is configured to manage the imaging modes and to process data according to the determined imaging mode.

6. The apparatus according to claim 1, wherein the processor is configured to form 3D image information from the data formed by the camera module.

7. The apparatus according to claim 6, wherein the processor is configured to process image errors.

8. The apparatus according to claim 1, wherein the processor is configured to combine the data formed by the camera module, at least partly to increase the resolution of the image information.

9. The apparatus according to claim 1, wherein the processor is configured to combine the data formed by the camera module at least partly to permit a panorama-imaging mode.

10. A method comprising:
  determining an imaging mode for a camera module comprising at least two cameras,
  adjusting a mutual position of the cameras to correspond to the determined imaging mode, and wherein the adjusting of the mutual position comprises causing turning of the cameras relative to each other by altering mutual distance between the cameras, if the mutual position of the cameras do not correspond to the determined imaging mode,
  forming data by the camera module,
  processing the data by a processor according to the determined imaging mode, in order to form image information, and causing the turning of the cameras relative to each other to correspond to the current imaging mode in response to the mutual distance between the cameras being altered by a mechanical connection between the cameras.

11. The method according to claim 10, wherein the mutual position of the cameras relative to each other is altered by the user manually moving the cameras.

12. The method according to claim 10, wherein the camera module is part of an apparatus, which apparatus additionally includes a display component configured on one side, wherein the imaging data is formed from the opposite side of the apparatus relative to the display component.

13. The method according to claim 10, wherein the data is formed to form 3D image information.

14. The method according to claim 13, wherein the data is processed to process image errors.

15. The method according to claim 10, wherein the data are combined at least partly with each other to increase the image resolution.

16. The method according to claim 10, wherein the data are combined at least partly with each other to permit a panorama-imaging mode.

17. A camera module comprising at least two cameras, where a mutual position of said at least two cameras is functionally configured to be altered to correspond to a determined imaging mode, wherein the altering is configured such that adjusting the distance between the cameras is configured to cause turning of the cameras relative to each other, the camera module further comprising a mechanical connection between the cameras, wherein the mechanical connection is configured to cause the turning of the cameras relative to each other to correspond to the determined imaging mode in response to the mutual distance between the cameras being altered.

18. The camera module according to claim 17, wherein an index patterning is configured in the camera module, to lock the distance between the cameras to correspond to the determined imaging mode.

19. A computer-readable non-transitory storage medium stored with program code, which when executed by a processor of an apparatus performs:
  adjusting a mutual position of a camera module comprising at least two cameras to correspond to a determined imaging mode, and wherein the adjusting of the mutual position comprises causing turning of the cameras relative to each other by altering the mutual distance between the cameras, if the mutual position of the cameras do not correspond to the determined imaging mode,
  forming data by the camera module, and
  processing the data according to the determined imaging mode, in order to form image information, wherein causing the turning of the cameras relative to each other to correspond to the current imaging mode in response to the mutual distance between the cameras being altered is performed by a mechanical connection between the cameras.

* * * * *